(12) United States Patent
Stepanian

(10) Patent No.: US 8,122,477 B1
(45) Date of Patent: Feb. 21, 2012

(54) SYSTEM AND METHOD FOR VIDEO DISTRIBUTION

(76) Inventor: Gary L. Stepanian, Foley, AL (US)

( * ) Notice: Subject to any disclaimer, the term of this patent is extended or adjusted under 35 U.S.C. 154(b) by 1169 days.

(21) Appl. No.: 11/973,554

(22) Filed: Oct. 9, 2007

Related U.S. Application Data

(60) Provisional application No. 60/850,297, filed on Oct. 10, 2006.

(51) Int. Cl.
*H04N 7/173* (2006.01)
*G06Q 10/00* (2006.01)
*G06Q 20/00* (2006.01)

(52) U.S. Cl. ............. 725/91; 725/87; 725/88; 725/97; 705/80; 705/307

(58) Field of Classification Search ............ None
See application file for complete search history.

(56) References Cited

U.S. PATENT DOCUMENTS

| | | | |
|---|---|---|---|
| 5,612,730 A | 3/1997 | Lewis | |
| 5,781,734 A | 7/1998 | Ohno et al. | |
| 5,909,638 A * | 6/1999 | Allen | 725/146 |
| 6,035,329 A | 3/2000 | Mages et al. | |
| 6,262,722 B1 * | 7/2001 | Allison et al. | 725/39 |
| 6,842,785 B1 | 1/2005 | Norcott et al. | |
| 6,948,070 B1 | 9/2005 | Ginter et al. | |
| 7,343,330 B1 * | 3/2008 | Boesjes et al. | 705/28 |
| 2002/0023274 A1 * | 2/2002 | Giacalone, Jr. | 725/146 |
| 2002/0143565 A1 * | 10/2002 | Headings et al. | 705/1 |
| 2002/0178446 A1 * | 11/2002 | Sie et al. | 725/32 |
| 2004/0015993 A1 | 1/2004 | Yacenda et al. | |
| 2004/0103445 A1 | 5/2004 | Yoon et al. | |
| 2004/0268386 A1 | 12/2004 | Logan et al. | |
| 2005/0076304 A1 | 4/2005 | Shing | |
| 2005/0086127 A1 | 4/2005 | Hastings et al. | |
| 2005/0154681 A1 | 7/2005 | Schmelzer | |
| 2005/0204394 A1 | 9/2005 | Nguyen | |
| 2005/0235309 A1 | 10/2005 | Nathan | |
| 2008/0065552 A1 * | 3/2008 | Elazar et al. | 705/59 |

* cited by examiner

*Primary Examiner* — Mark D Featherstone
(74) *Attorney, Agent, or Firm* — George L. Williamson

(57) ABSTRACT

A method and system for a Virtual Video Store (VVS) System for distributing video. Shown is an on-premise locked storage vault or remote video rental storefront vault, wherein multiple purchased copies are physically placed in the vault and at least one is digitally stored. The vault contains a plurality of copies of a title which titles have been purchased. The VVS Digital Encoder System would store the titles into the video server storage unit so that the vendor could get multiple plays from a single digitally stored copy. Content control is provided prior to storage in the Administration Database Server for the Middleware. Also, Cover Art is provided for scanning prior to storage in the video server storage unit. Meta Data is input into the Administration Database. The Movie ID number is input into the Virtual Video Store System Database Control Server to allow Database and Control Exchange. Unlike the VOD model, the VVS utilizes a purchase and rent model whereby, just like a video store, copies become unavailable when all virtual copies are in use. The distribution network provides data into various viewer control and display system outlets including a Set Top Box for TV viewing, a laptop computer, mobile phones or PDA's or home theaters. Various modules provide practical user operational functions and emphasis is placed on providing a "certifiable" software tracking system and business model.

25 Claims, 14 Drawing Sheets

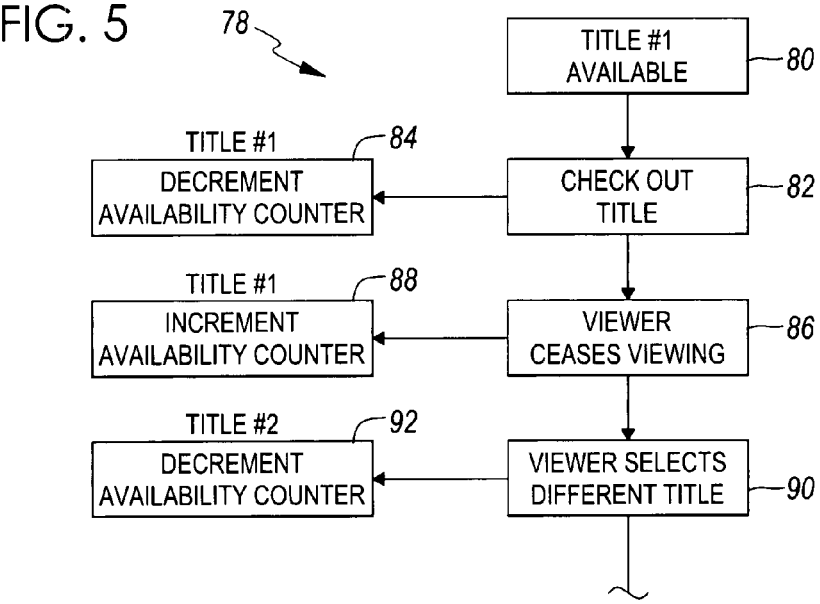
FIG. 5
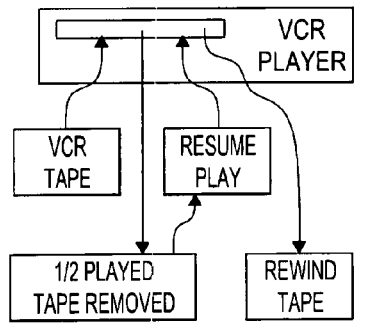
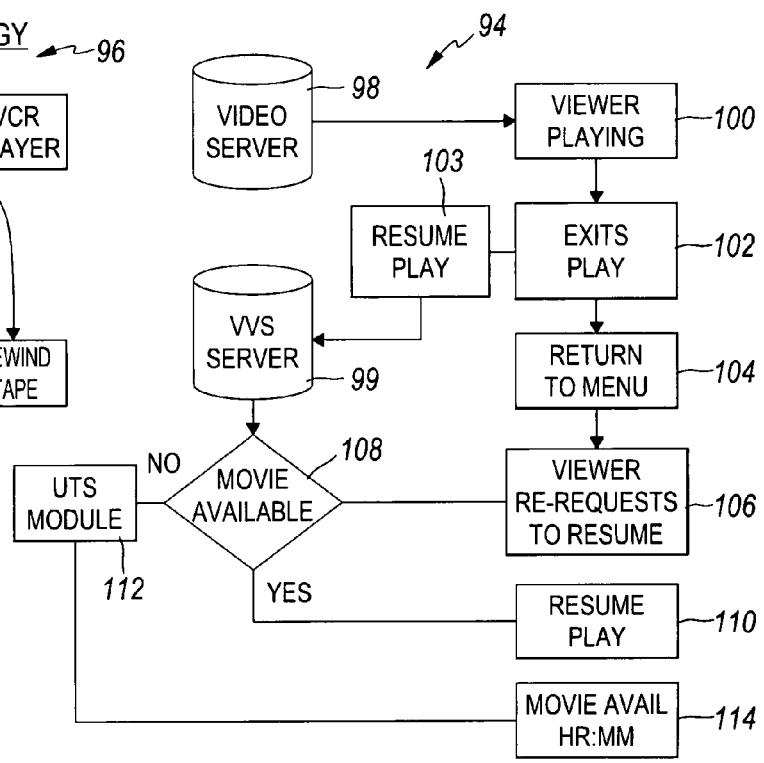
FIG. 6

154 152

| MOVIE TITLE LIST -SORTED BY AVAILABILITY | | SIMILAR | SIMILAR | SIMILAR |
|---|---|---|---|---|
| COMEDY | AVAILABLE | ACTOR | SERIES | GENRE |
| LOST WORLDS COLLIDE | NOW | ☐ | ☐ | ☐ |
| SISTERHOOD OF THE | NOW | ☐ | ☐ | ☐ |
| BEWITCHED (RED) | 07:31P | ☐ | ☐ | ☐ |
| MISS CONGENIALITY (RED) | 07:32P | ☐ | ☐ | ☐ |
| JUST MARRIED (RED) | 07:41p | ☐ | ☐ | ☐ |
| AMERICAN PIE | 08:02P | ☐ | ☐ | ☐ |
| THE STING | 08:22P | ☐ | ☐ | ☐ |

156 — (rows 1–2)
158 — (rows 3–7)

162 — PACKAGES

| PACKAGE | ▽ |
|---|---|
| CLASSIC TV EPISODES | |
| PINK PANTHER GROUP | |
| DETECTIVE SERIES | |
| KIDS TIME | |
| GREAT SPORTS MOMENTS | |

PACKAGE CLASSIC TV EPISODES — 165

|  |  | # AVAIL | # UNAVAIL | SELECT |
|---|---|---|---|---|
| 3 STOOGES | ($3.99) | 4 (GREEN) | 2 (RED) HR:MM | ☐ |
| SEINFELD | ($4.99) | 5 (GREEN) | 1 (RED) HR:MM | ☐ |
| SANFORD & SON | ($10.99) | 16 (GREEN) | 0 | ☐ |
| BONANZA | ($1.99) | 4 (GREEN) | 10 (RED) HR:MM | ☑ |
|  |  |  |  | ☐ |
|  |  |  |  | ☐ |
|  |  |  |  | ☐ |

$1.99 BONANZA EPISODES — 166

|  |  | SELECT |
|---|---|---|
| LITTLE JOE GETS A DANCE | NOW | ☐ |
| EPISODE 2 | NOW | ☐ |
| EPISODE 3 | NOW | ☐ |
| EPISODE 4 | NOW | ☐ |
| EPISODE 5 | AVAIL HR:MM | ☐ |
|  |  | ☐ |
|  |  | ☐ |

☐ BUY PACKAGE
☐ RETURN TO PREVIOUS MENU    [ OK ]

FIG. 11A

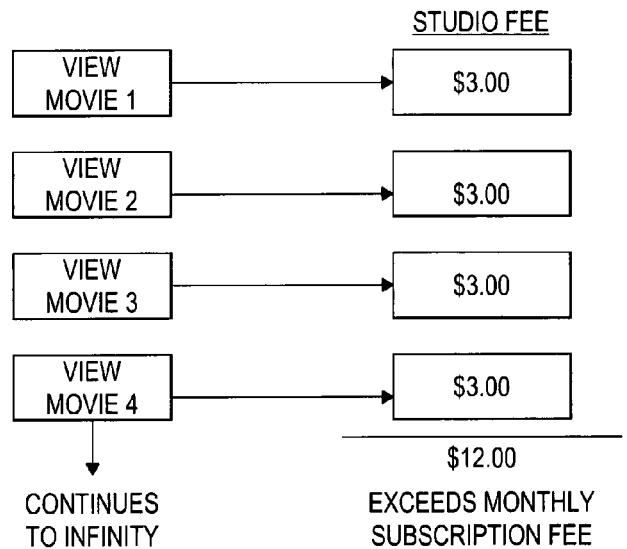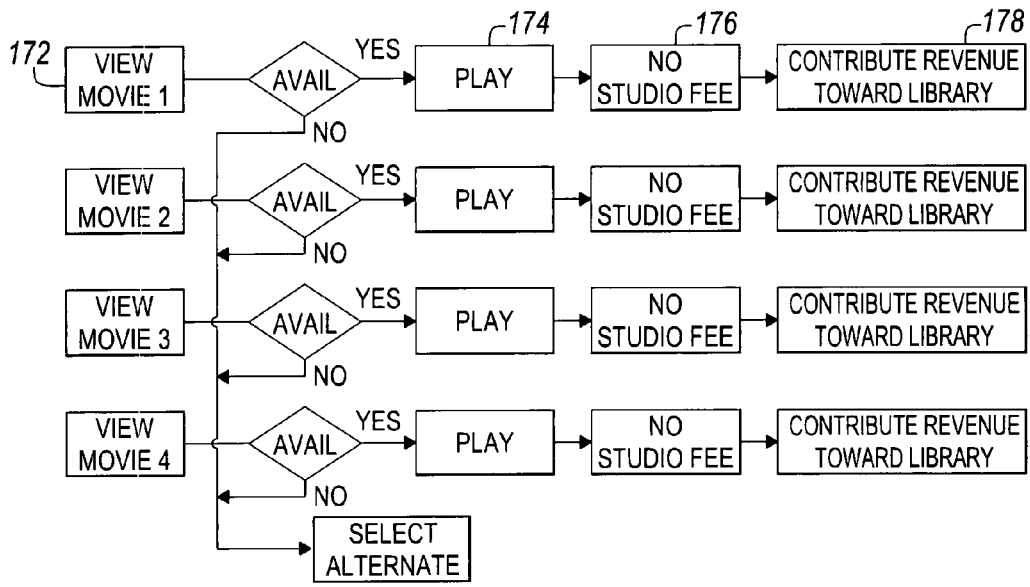
FIG. 12A

SYSTEM AND METHOD FOR VIDEO DISTRIBUTION

RELATED APPLICATIONS AND DOCUMENTS

This application claims benefit of U.S. Provisional Patent Application Ser. No. 60/850,297 filed on Oct. 10, 2006. This application is also related to Disclosure Document Deposit 596823 filed on Feb. 27, 2006.

BACKGROUND OF THE INVENTION

1. Field of the Invention

The present invention generally relates to a business method for video distribution and, more particularly, is concerned with a business method and system for distributing video.

2. Description of the Prior Art

Systems and methods related to video distribution have been described in the prior art. However, none of the prior art discloses the unique features of the present invention.

U.S. Pat. No. 6,948,070 dated Sep. 20, 2005 to Ginter, et al., disclosed a system and method for secure transaction management and electronic rights protection.

U.S. Pat. No. 6,842,785 dated Jan. 11, 2005, to Norcott, et al., disclosed a remote video delivery system which transmits video and text from a hotel office to hotel rooms.

U.S. Pat. No. 5,781,734 dated Jul. 14, 1998 to Ohno, et al., disclosed a system comprising a management section, a plurality of terminal sections and coaxial cable for providing audio and video services on demand.

U.S. Patent Application Publication No. U.S. 2005/0086127 A1 dated Apr. 21, 2005, to Hastings, et al. disclosed an approach for managing rental items across a plurality of distribution locations.

U.S. Patent Application Publication No. U.S. 2004/0015993 A1 dated Jan. 22, 2004 to Yacenda, et al. disclosed a system and method for providing movies on demand.

U.S. Patent Application Publication No. U.S. 2004/0268386 A1 dated Dec. 30, 2004 to Logan, et al., disclosed a virtual DVD library for distributing media content, usually video on demand system or the like.

U.S. Patent Application Publication No. U.S. 2005/0076304 A1 dated Apr. 7, 2005 to Shing disclosed a method and system for remote playback of a DVD.

U.S. Pat. No. 6,035,329 dated May 7, 2000 to Mages, et al. disclosed a method of securing the playback of a DVD ROM via triggering data sent via a cable network.

U.S. Patent Application Publication No. U.S. 2004/0103445 A1 dated May 27, 2004, to Yoon, et al., disclosed a method for reproducing contents information in interactive optical disk device and method for providing contents information in a contents provider server.

U.S. Patent Application Publication No. U.S. 2005/0154681 A1 dated Jul. 14, 2005 to Schmelzer disclosed a copyright detection and protection system and method.

U.S. Patent Application Publication No. U.S. 2005/0235309 A1 dated Oct. 20, 2005 to Nathan disclosed a method for the distribution of audio-visual information and a system for the distribution of audio-visual information.

U.S. Patent Application Publication No. U.S. 2005/0204394 A1 dated Sep. 15, 2005 to Nguyen disclosed a movie distribution system for distributing data representing movies and/or mini-series.

U.S. Pat. No. 5,612,730 dated Mar. 18, 1997 to Lewis disclosed an interactive system for a closed cable network.

While these video distribution related methods and systems may be suitable for the purposes in which they were designed, they would not be suitable for the purposes of the present invention as hereinafter described.

SUMMARY OF THE PRESENT INVENTION

The present invention discloses a method and system for a Virtual Video Store (VVS) System for distributing video. Shown is an on-premise locked storage vault or remote video rental storefront vault, wherein multiple purchased copies are physically placed in the vault and at least one is digitally stored. The vault contains a plurality of copies of a title which titles have been purchased. The VVS Digital Encoder System would store the titles into the video server storage unit so that the vendor could get multiple plays from a single digitally stored copy. Content control is provided prior to storage in the Administration Database Server for the Middleware. Also, Cover Art is provided for scanning prior to storage in the video server storage unit. Meta Data is input into the Administration Database. The Movie ID number is input into the Virtual Video Store System Database Control Server to allow Database and Control Exchange. Unlike the VOD model, the VVS utilizes a purchase and rent model whereby, just like a video store, copies become unavailable when all virtual copies are in use. The distribution network provides data into various viewer control and display system outlets including a Set Top Box for TV viewing, a laptop computer, mobile phones or PDA's or home theaters. Various modules provide practical user operational functions and emphasis is placed on providing a "certifiable" software tracking system and business model. The overall goal is to move the proven video rental storefront model into the 21$^{st}$ century, to online users, and to provide video rental storefronts a new way to acquire content.

An object of the present invention is to provide a means for an entertainment vendor to buy large quantities of a film/video upon a release of a newly released film and provide a system corresponding to checking out the tapes/DVD's up to the limit of the copies purchased and available just as they would be at a conventional video store. A further object of the present invention is that once the title is checked out they would not be available to other viewers other than those in the immediate viewing range of the user's DVD/TV. Furthermore an object of the present invention is to provide a system wherein after a title was checked out it would be unavailable to rent to others until it was returned.

The following detailed description is, therefore, not to be taken in a limiting sense, and the scope of the present invention is best defined by the appended claims.

BRIEF DESCRIPTION OF THE DRAWINGS

In order that the invention may be more fully understood it will now be described, by way of example, with reference to the accompanying drawings in which:

FIG. 5 is a diagram of the usage cancellation software of the present invention.

FIG. 6 is a diagram of the title resume memory software of the present invention.

FIG. 10 is a diagram of the library control system of the present invention.

FIGS. 11 and 11A are diagrams of the packages administration system of the present invention.

FIG. 12A is a diagram of portions of the movie club module of the present invention.

DETAILED DESCRIPTION OF THE PREFERRED EMBODIMENT

Figure 1:
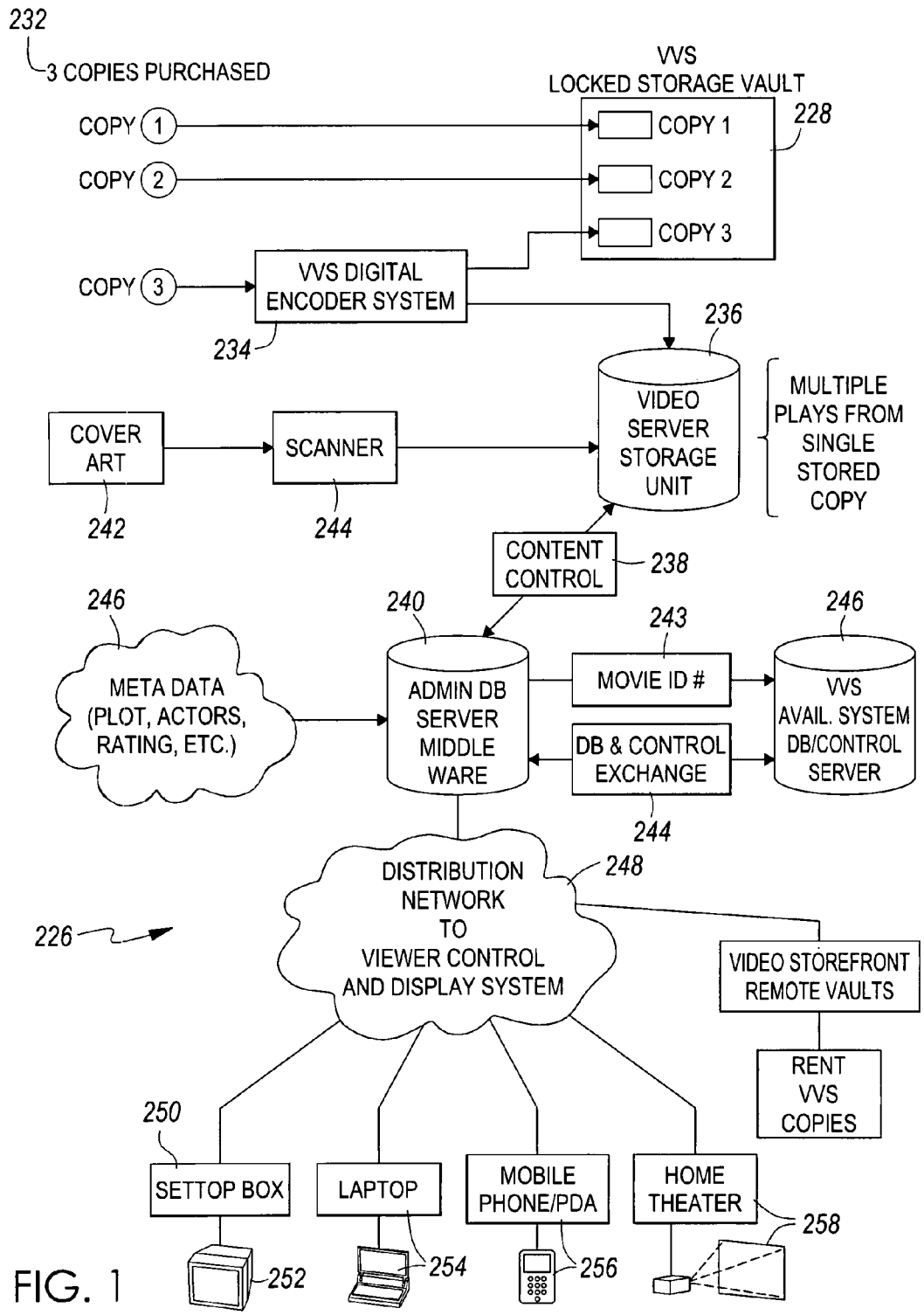
FIG. 1 is a diagram of the present invention.

The following discussion describes in detail at least one embodiment of the present invention. This discussion should not be construed, however, as limiting the invention to those particular embodiments since practitioners skilled in the art will recognize numerous other embodiments as well. For a definition of the complete scope of the invention, the reader is directed to the appended claims. FIGS. 1 through 14 illustrate the present invention wherein a virtual video store distribution system is disclosed.

By way of general explanation of the background of the problems sought to be solved by the present invention, the movie industry has struggled to find a way to move into the next generation of services. Up until the proliferation of digital video ripping, the ideal model, i.e., the Video Store Model, consisted of following up the initial release of a movie to the $100 million+ theater circuit with a Video Store VHS/DVD release which could generate as much or more than the theater circuit revenues. During the pre-video store days, i.e., prior to the successful implementation of the aforementioned video store model, there was great concern about the erosion of the theater revenue that the release of video store tapes would cause. However, after analyzing the actual market response, it became apparent that rather than eroding revenues, it more than doubled them. Hence, there has been a long running success with the video store model. The essence of the video store model is that additional revenues to the studios results from the "new release" of content to video stores and other distribution points. This "new release" was usually in large numbers, typically 20 to 50 copies of each title per video store, wherein the retail price charged to the customer included the full cost of the media. Of course, after the initial "new release" window, the video stores sold the content, including VHS tapes, DVDs, and games, at a reduced rate to loyal customers who added them to their personal libraries. The video store model could be considered to be in the "Grey Area" due to the unknowns of the market erosion, as well as the legality of buying content once, and then renting it over and over. In the end, the fact that large amounts of new revenue resulted overrode the fact that there was some potentially lost revenue once the sale was made to the video store, so that a controllable, definable revenue model was created that actually worked.

Since that time, many new schemes have been devised to try and improve on the video store model, which is quickly becoming obsolete. For example, the Netflix model that involves mailing DVD's back and forth, the "monthly rental clubs" and numerous other attempts have been tried.

The model that seemed to be the perfect one, is the revenue sharing, pay per play scheme. The typical revenue split is 60% to the studio and 40% to the vendor. Unfortunately, the only time this model has worked, is for the adult market, which usually has a revenue split of 15% to the Studio and 85% to the vendor, due to the low studio costs of the content. This model has not been successful, because in reality, this model is not a natural extension of the video store model because viewers are limited to a single viewing of the content. Also, the Entertainment Vendor (EV) cannot recoup their investment in content acquisition, transport, and customer premise equipment (CPE) which is required to be protected, played and billed for.

It is believed that the Virtual Video Store (VVS) of the present invention is the next generation model of the video store model that offers nearly identical revenues to both the studios as well as the entertainment vendor. The VVS has many of the features of the video store model such as: 1) the EV buys large up front quantities upon new release of the newly released film; 2) Viewing privileges correspond to checking out the tapes/DVD's to the limit of the copies purchased and available at the video store; 3) Once titles are checked out, they are not available to other viewers, other than those in the immediate viewing range of the renter's TV; 4) Titles which are checked out are unavailable to rent to others until returned by the renter; 5) Copying of rented content is not permitted; 6) After the "new release period" titles can be sold; and, 7) There is no limit to the number of times that a title can be rented or viewed, as long as it is never rented to more than one renter at a time, and was legitimately purchased by the VVS.

Furthermore, the present invention also overcomes some of the shortcomings inherent to the old Video Store Model which included: 1) Renters often copy content while it is in their control; 2) Customers are required to deal with late fees, trips to the video store, and lack of spontaneous availability; 3) Customers must own players that they purchase and maintain; and, 4) Potential revenue for both studio and EV could be lost if too few copies were purchased at the "new release" period.

Some advantages of the present invention include: 1) Content is secure due to both in vault storage, and digitally stored copies; 2) Only content from purchased copies will be distributed; 3) Only available copies will be rented; 4) If insufficient copies are available, additional copies will be immediately purchased; 5) Users cannot copy content; 6) Players are furnished by EV; 7) There are no Late Fees; 8) there are no trips to a video store because video is delivered to the home; 9) Studios get guaranteed revenue, not dependent on number of viewings; 10) All studio money is up front; 11) Viewing rules are certifiable; and, 12) Control Software is certifiable.

It should be clear that the VVS, is an exciting extension of the storefront video store model and is a solution that is unique and timely. Some of the features of the VVS include the following: 1) Virtual Video Check-out-System (COS); 2) Availability Certification Software (ACS); 3) Usage Timer System (UTS); 4) Usage Cancellation Software (UCS); 5) Title Resume Memory Software (TRMS); 6) Automatic Purchase Requisition Software (APRS); 7) Title Availability/Unavailability Screen; 8) Title Substitution System (TSS); 9) Library Control System (LCS); 10) Packages Administration System (PAS); 11) Movie Club Module (MCM); 11) Storefront Video Store Integration Software; and, 12) Internet based VVS. These combined subsystems comprise the "Virtual Video Store" (VVS) software system. This is a simple but revolutionary concept that emulates the functionality and business model of storefront video stores. The VVS has been developed to ensure the content providers, studios and entertainers of their rightful compensation. The VSS provides a secure environment for continuing the successful video store model into the "digital age".

Turning to FIG. 1, shown therein is a overall illustration of the present invention which is the Virtual Video Store System 226. Shown is an on-premise locked storage vault at 228 wherein multiple purchased copies 232 are physically placed in the vault and at least one is digitally stored at 234. Vault 228 contains a plurality of copies of a title at 228 which titles have been purchased at 232. The VVS Digital Encoder System at 234 would store the titles into the video server storage unit 236 so that the vendor could get multiple plays from a single digitally stored copy. Content control is provided at 238 prior to storage in the Administration Database Server for the Middleware at 240. Also, Cover Art at 242 is provided for scanning at 244 prior to storage in the video server storage unit 236. Meta Data 246 is input into the Administration Database 240. The Movie ID number 243 is input into the Virtual Video Store System Database Control Server 246 to allow Database and Control Exchange 244. The distribution network is provided at 248 to provide data into various viewer control and display system outlets including a Set Top Box at 250 for TV viewing 252, a laptop computer at 254, mobile phones or PDA's at 256 or home theaters at 258.

Figure 2:
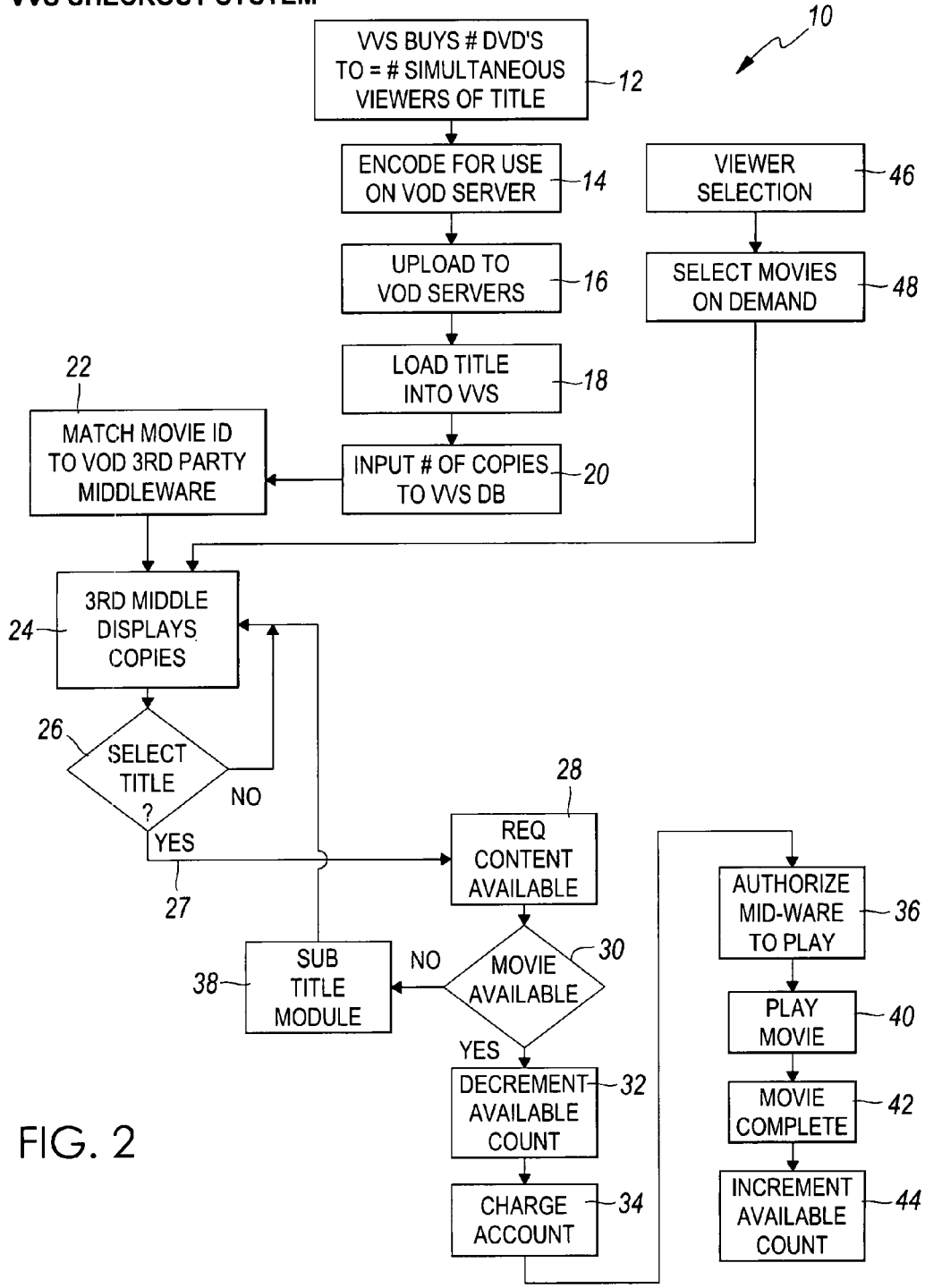
FIG. 2 is a diagram of the check out system of the present invention.

Turning to FIG. 2, by way of general explanation, shown therein is Virtual Video Check-Out System (COS). The COS consists of a software database that tracks the actual owned VVS titles, including the quantity of certified owned titles, which are stored and secured in the VSS vault. The vault is a locked storage unit that physically secures legally owned DVD's or VHS tapes, purchased for rental using the VVS. The number of DVD's, by title, is coordinated with the COS software to assure that no unowned DVD's are rented as virtual titles. Since the COS database keeps track of the number of owned DVD titles, it can assure that only the number of actual owned titles in the vault can be rented at any given time, which is the same rule applied at storefront video stores. The COS database includes "meta data", information about the title, as well as the number of copies owned, available, and rented out. Each time a movie rental is requested, the Availability Certification Software (ACS) verifies that the title has available copies to be rented based on the total number of owned copies less the number already rented out. If the number of "available copies" is 1 or more, than the system authorizes the viewing system software, often referred to as "Middleware", to play the requested title, decrement the available copies count, and starts a countdown timer based on the UTS system's database field containing the movie run time. Once the UTS countdown timer expires, the "available titles" counter is incremented, which then makes the title available for rental. Since the "available copies" count is decremented each time a movie is rented, and incremented after viewing is complete, the primary patentable function of the Virtual Video Store is maintained: VVS assures that no title is ever rented, at any given time, than the number of legally owned copies. The COS is the central element of the VVS because the COS database holds all of the count certification data.

Shown in FIG. 2 is The Virtual Video Store Check-Out System 10 which is initiated when the Virtual Video Store buys a number of DVD's at 12 to equal the number of simultaneous viewers allowable for the title which is then followed by encoding at 14 for use on the Video On Demand (VOD) Server which is then uploaded to the VOD Server at 16 which loads the title into the Virtual Video Store at 18 so that the number of copies is input to the video VVS database at 20 to match the movie ID to the video on demand third party Middleware at 22 so that the third party Middleware displays the copies of the title at 24. A viewer selects a movie title at 26 and then after viewing all the titles selects the desired movie on the server at 27. Initially, a viewer at 46 selects movies on demand at 48 which is transmitted to the Middleware 24. The title is selected at 26 in order to determine if the requested content is available 28 so that a determination can be made whether the movie is available at 30 so that the available count is decremented at 32 or a request is made to the substitute Title Module 38 for a different title. The selection is charged to the customer account at 34 and authorizes the Middleware to play the title at 36. The movie is played at 40 and completed at 42 so as to increment the availability counter at 44.

Figures 3, 4:
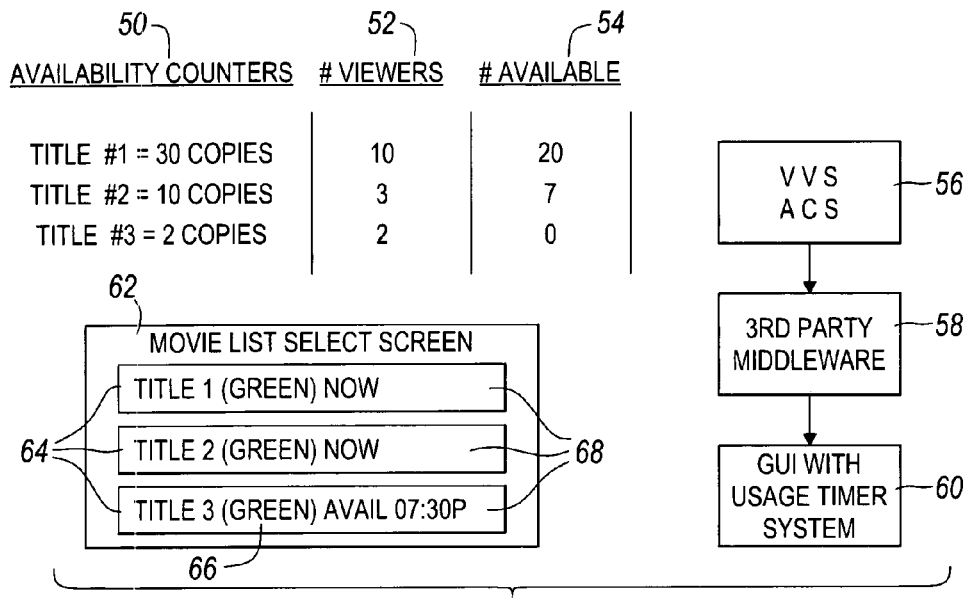
FIG. 3 is a diagram of the availability certification software of the present invention.
FIG. 4 is a diagram of the usage timer system of the present invention.

Turning to FIG. 3, by way of general explanation, shown therein is the Availability Certification Software (ACS). Availability Certification Software (ACS) is a critical element of VVS because it validates the number of titles for rent. In cooperation with the COS, ACS integrates the user experience with the COS database and the UTS software. When a user requests a genre of movies, such as "action", "comedy" or "drama", the ACS software transfers the availability status, if there are copies available, or the remaining time of the next available copy, into the middleware's title list. When a movie is available, the Graphical User Interface (GUI), indicates this by displaying the title bar in a bold color. When the title is unavailable, the GUI indicates this by displaying the title bar in a diminished (grayed out) format, with a text note that the title will become available at a certain HH:MM (time in hours and minutes). Availability per title is passed to the middleware application utilizing OBDC, XML, SQL or other standard data transfer methods and/or formats.

Shown in FIG. 3 are the Availability Counters 50 determining that total number of each exemplary title available along with number of viewers 52 leaving the titles available for viewing at 54 which is input into the Availability Certification Software (ACS) 56 which is then input into the third party Middleware 58 and the Graphic User Interface with Usage Timer System (UTS) at 60. Also shown is a Movie List Selection Screen (SCR) at 62 showing individual titles 64 having a color-coded identifier 66 which shows the availability of each title at 68.

Turning to FIG. 4, by way of general explanation, shown therein is the Usage Timer System (UTS). The Usage Timer System (UTS) is the timer algorithm that calculates the remaining time of each of the rented out copies of the title. When the COS database counter reaches zero for any given title, the UTS software searches the remaining time fields and determines the shortest available "wait" time, and passes the wait time to the ACS software for integration to the GUI for the user, as described in FIGS. 2 and 3. The uniqueness of the UTS is the fact that rather than just indicating whether a title is available or not, it calculates the shortest wait and tracks that for the benefit of users waiting for a title to become available. Also, when a user "pauses" the play, the UTS system begins to add the corresponding time to the "wait" time for that particular copy. After the "pause" exceeds a maximum time, as contained in the administrator defined variable, the movie viewing is terminated, and the wait time is set to "zero", thereby releasing the movie. Users whose movies are terminated by the maximum pause timer, or users who deliberately terminate the title, have the frame time code stored in the TRMS database, described later in this specification, for the purpose of allowing them to "resume" viewing at the same point in the movie, assuming that a title is "available" for them to re-rent.

Shown in FIG. 4 is the Usage Timer System (UTS) at 70 wherein the movie title database 72 determines for each copy of a title the start, duration and anticipated finish/availability for each title. This example uses Title #3 from FIG. 3; note that the finish time of 7:30 p.m. for Copy #1 is shown for Title 3 at 64 in FIG. 3. Also shown at 74 for each copy of the title is an example of the copy being compared to the start and finish for a case when the duration has been increased with a pause showing the new finish/availability time so that when, e.g., the copy #2, is paused, a new next available time of 07:57 is generated. Furthermore, at 76 shown is an example wherein in copy #2 a preset pause time has been exceeded so that the copy is restored to the immediately available category.

Turning to FIG. 5, by way of general explanation, shown therein is the Usage Cancellation Software (UCS). It becomes important that the COS software always have an accurate count of titles actually viewed. An issue can develop when a user selects a title and terminates viewing prior to the normal elapsed time, e.g., to view a different title. Since each user Set-Top-Box (STB) can only view one movie at a time, when a viewer changes to a different title, the UCS notifies the UTS module for the purpose of releasing the title for rent to another viewer. The uniqueness of the USC feature is that it eliminates an artificial "stack-up" of titles by a viewer who "shops" for a movie by selecting movies to replace previously selected titles, and flagging many movies as being viewed. This particularly applies to users on a "library" or "movie club" plan, where unlimited titles can be viewed.

Shown in FIG. 5 is the Usage Cancellation Software or UCS at 78 showing the title #1 being available at 80 wherein the title is checked out at 82 and the availability counter is decremented at 84. Next, the viewer ceases viewing title #1 at 86 which causes the availability count to increment at 88. Next the viewer selects a different title at 90 which decrements the availability counter at 92 for the different title.

Turning to FIG. 6, by way of general discussion, shown therein is the Title Resume Memory Software (TRMS). In order to further emulate the storefront video store experience, if a user ejects a tape at a given point, and resumes playing it later when it is re-inserted into the player, the TRMS module keeps track of the title and frame time when the movie was stopped, and stores it by subscriber in the COS database. The next time a user requests a title, the TRMS checks the subscriber database to see that particular title has already been rented by the user, and if it has, it offers the user a choice of "starting over" or "resuming" from the previous viewing session. The uniqueness of the TRMS is more than just keeping track of the point of last viewing point; it is a mechanism to emulate the way video store users rent DVD's and video tapes, by integrating it with the rental experience, COS, UCS, UTS, ACS and other VVS modules.

Shown in FIG. 6 is the Title Resume Memory Software (TRMS) 94 and FIG. 6 also shows a comparative example of a well known prior art technology example 96 which includes a VCR player showing the VCR tape insertion, removal, resumption of play and rewinding of a tape. The present invention emulates this by having a video server 98 having a viewer 100 playing from the video server 98 shown by the user next exiting play at 102 and then either resumes play at 103 or moves to return to menu at 104 so that a viewer can re-request to resume play at 106 which shows a movie available at 108 from the VVS server 99 and also allows the movie to resume playing at 110 and also shows input to a UTS module 112. If the movie was not available, then that movie would be shown to be available for play later at the HH:MM at 114.

Figure 7:
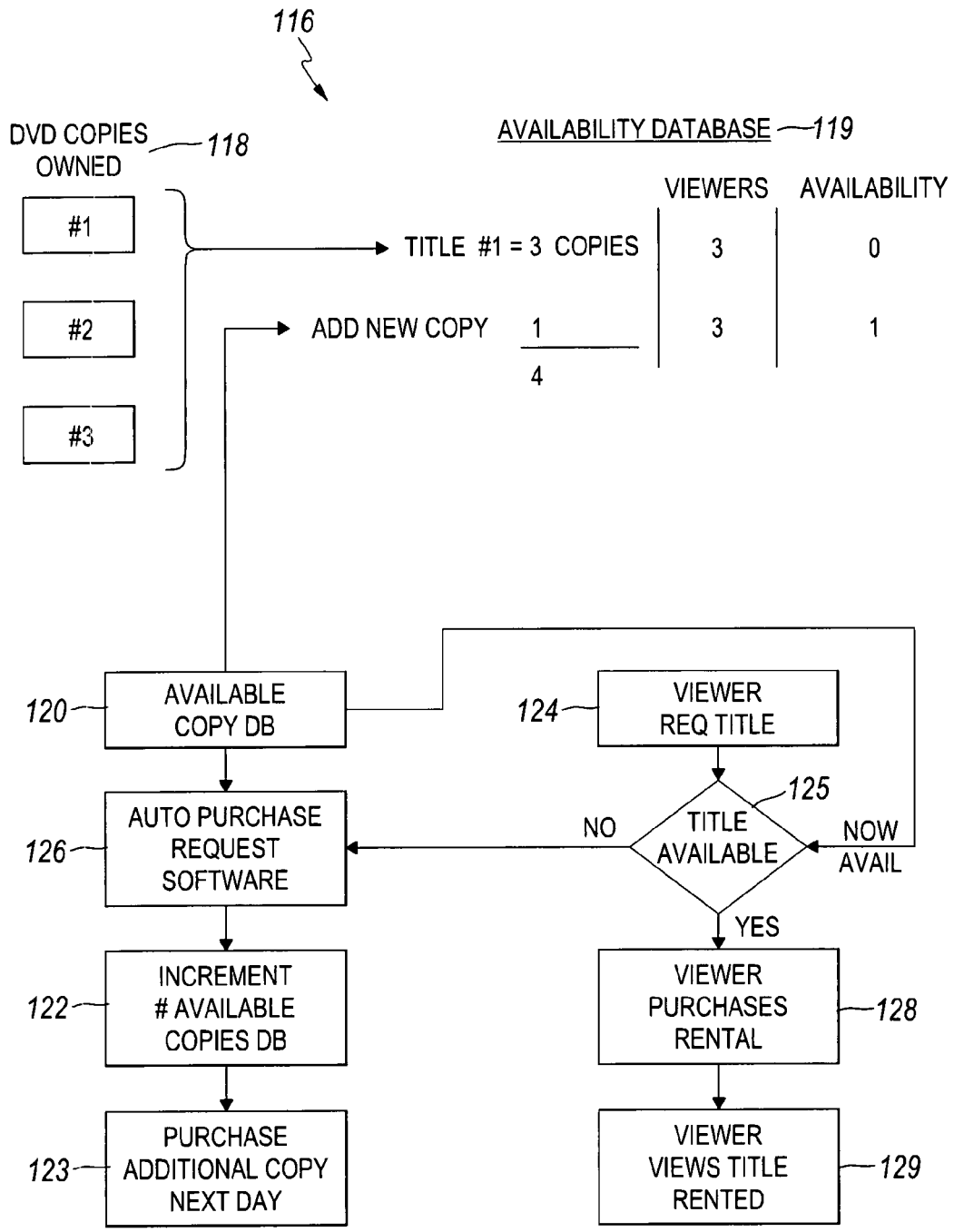
FIG. 7 is a diagram of the automatic purchase requisition software of the present invention.

Turning to FIG. 7, by way of general explanation, shown therein is the Automatic Purchase Requisition Software (APRS). When new releases are entered into the VVS, the exact number of owned copies is entered. On occasion, marketing personnel may underestimate the popularity of a title. In such cases, the title may be programmed to utilize Automatic Purchase Requisition Software (APRS), which increments the available quantity by a pre-programmed amount and automatically places a purchase requisition for the additional copies, proceeds to re-classify the title as "available" and plays the selection. The intent of this important function is to minimize "lost opportunity" for both the studio and the VVS. Storefront video stores would send the customer away, just at the moment of greatest customer enthusiasm. The APRS provides a legitimate way to have virtually unlimited quantities of a title, since the VOD server technically can server thousands of streams by providing a way for a studio to generate higher levels of excitement in the viewing community, early on, when they are more likely to purchase the title. In the end, APRS maximizes both the studio sales while at the same time reducing customer frustration.

Shown in FIG. 7 is the Automatic Purchase Requisition Software (APRS) at 116. This includes a procedure for increasing the inventory of a title wherein the number of owned copies of a title at 118 is compared to the number of copies in inventory at 119 so that the available copies at 120 can be increased if more copies are needed. When a viewer requests a title at 124 and if the title is not available at 125, then the APRS software 126 purchases the extra title to increment the available copies at 122 and purchase an additional copy at 123. If a title is available when the viewer seeks it at 125, the viewer will simply purchase it at 128 for viewing at 129 and no additional purchase is made by the APRS.

Figure 8:
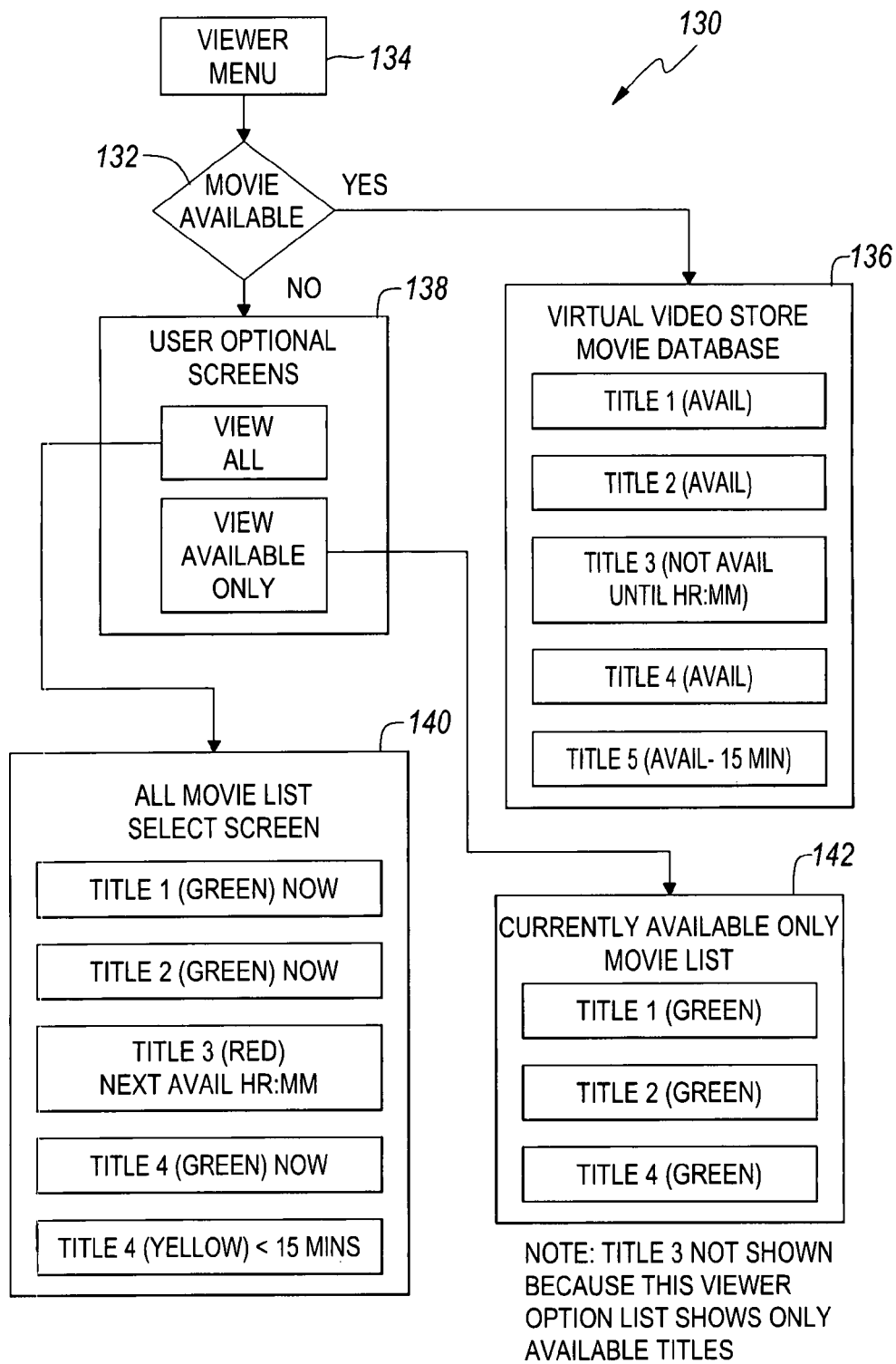
FIG. 8 is a diagram of the title availability/unavailability screen of the present invention.

Turning to FIG. 8, by way of general explanation, shown therein is the Title Availability/Unavailability Screen. Unlike storefront video stores, by using the VVS the user cannot see when a video container is empty (unavailable). An important component of the VVS is the availability/unavailability GUI screen. When the viewer selects a genre, the GUI helps the user by differentiating between titles that are currently available and those that are all checked out (unavailable). To assist the customer, on unavailable titles, there is a "time till available" window, which indicates when the title will become available as discussed with respect to FIG. 3. This feature will be delayed if the title has been identified as an APRS automatic restock item until the maximum number of automatically purchased titles is exhausted.

Shown in FIG. 8 is a title availability/unavailability optional screen system 130 wherein if a title is available for purchase at 132 and is flagged as such in VVS DB 136, the viewer chooses either "all movies list" 140, or, as discussed with respect to FIG. 3 showing all the titles and the actual time when the title will be available; alternatively the viewer is shown only the currently available titles at 142.

Figure 9:
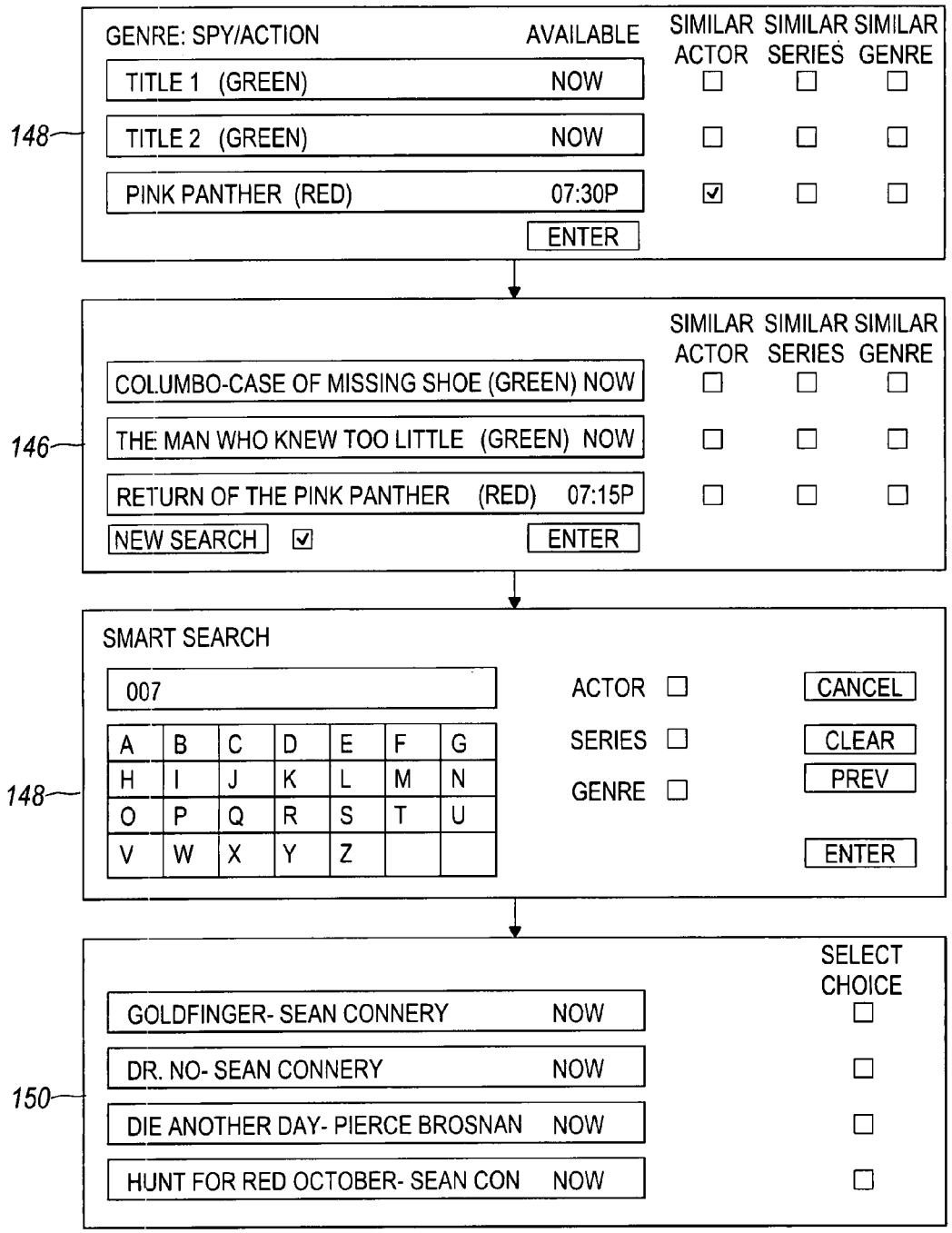
FIG. 9 is a diagram of the title substitution system of the present invention.

Turning to FIG. 9, by way of general explanation, shown therein is Title Substitution System (TSS). In the event that a title is unavailable, the TSS will provide alternative titles that have common elements with the original selected title. The candidates for the substitution list come from the COS system's keyword database fields. The keywords can consist of actors and actresses, similar genres such as comedy, or short subjects that would finish playing about the same time the original title will become available. The key element of the TSS is the intelligence of the search engine, or smart search.

Users are presented with numerous alternative search string choices suggested by the TSS. Additionally, the TSS screen will prove useful when a viewer is unsure of a title, but knows the artist or a similar title. For example, trying to pick a Pink Panther movie can be a challenge, however entering "Clouseau" could produce not only the Pink Panther movies, but other spy spoofs such as "The Man Who Knew Too Little," "Columbo," or even a "James Bond" movie. The uniqueness of this TSS feature is that it utilizes the keywords associated with an unavailable title to search for alternative titles as well as selection boxes that specify search criteria such as, but not limited to, "similar actor," "similar series," or "similar genre."

Shown in FIG. 9 is the Title Substitution System (TSS) 144 wherein an alternate title can be chosen from a list at 146 of titles similar to those to be displayed at 148 so then the user can have an alternative title to choose from. Titles shown are the result of various search string alternatives at 148 and 150 including the search criteria selection boxes. Example search results for "007" at 148 are shown at 150.

Turning to FIG. 10, by way of general explanation, shown therein is the Library Control System (LCS). The LCS is a database software system that controls the content usage of titles that are part of the video library. The LCS assists the user by keeping track of available titles in the library and arranging the titles so that the available titles are shown first, and the unavailable titles in ascending order based on "time till available". This system assumes that since all titles are in a specified group or genre, the exact order is of less importance to the viewer than availability. The LCS module assures that all titles in the Library are sorted by the VVS as directed by the COS database. The uniqueness of the LCS is that it manages and uniquely displays titles even with the idiosyncrasies of an "availability" based solution, while still preserving the genre that the user selects.

Shown in FIG. 10 is the Library Control System (LCS) 152 wherein the movie title list 154 indicates the available titles, such as comedy, showing the currently available titles first at 156 and then later available titles at 158.

Turning to FIG. 11, by way of general explanation, shown therein is the Packages Administration System (PAS). The Packages Administration System, (PAS), is a special software system that extends the LCS function to a higher level by combining multiple LCS library groups or genres so that users can rent from a group of libraries for a pre-determined fee. A "package," for example, can be defined as a combination of "live TV", "new releases", "old library titles", or "re-run TV programs", all for a package price. The PAS uses pull-down windows for each section of the package selection screen. The titles are grouped by type: live; new; old; re-runs; etc.; and then displayed with "available" titles first, then, in ascending "wait" order, and then unavailable titles. This complex algorithm mimics the storefront video store experience when renters look for several videos on a shelf, categorized by various groups. The uniqueness of this PAS feature is that packages are sorted by availability, and then by ascending wait times for unavailable titles. Each category type is displayed in this manner, offering a unique way to offer available titles before unavailable.

Shown in FIG. 11 is the Packages Administration System (PAS) at 160 showing various packages 162 grouped in such a way as to be listed by key words. The PAS 160 also feeds back at 164 into the LCS 152 as described with respect to FIG. 10 so as to coordinate the packages with the available titles shown in FIG. 10. FIG. 11A at 165 depicts a typical package menu screen and FIG. 11A at 166 shows an example of a typical package, both showing availability status, 165 by count, 166 by title.

Figure 12B:
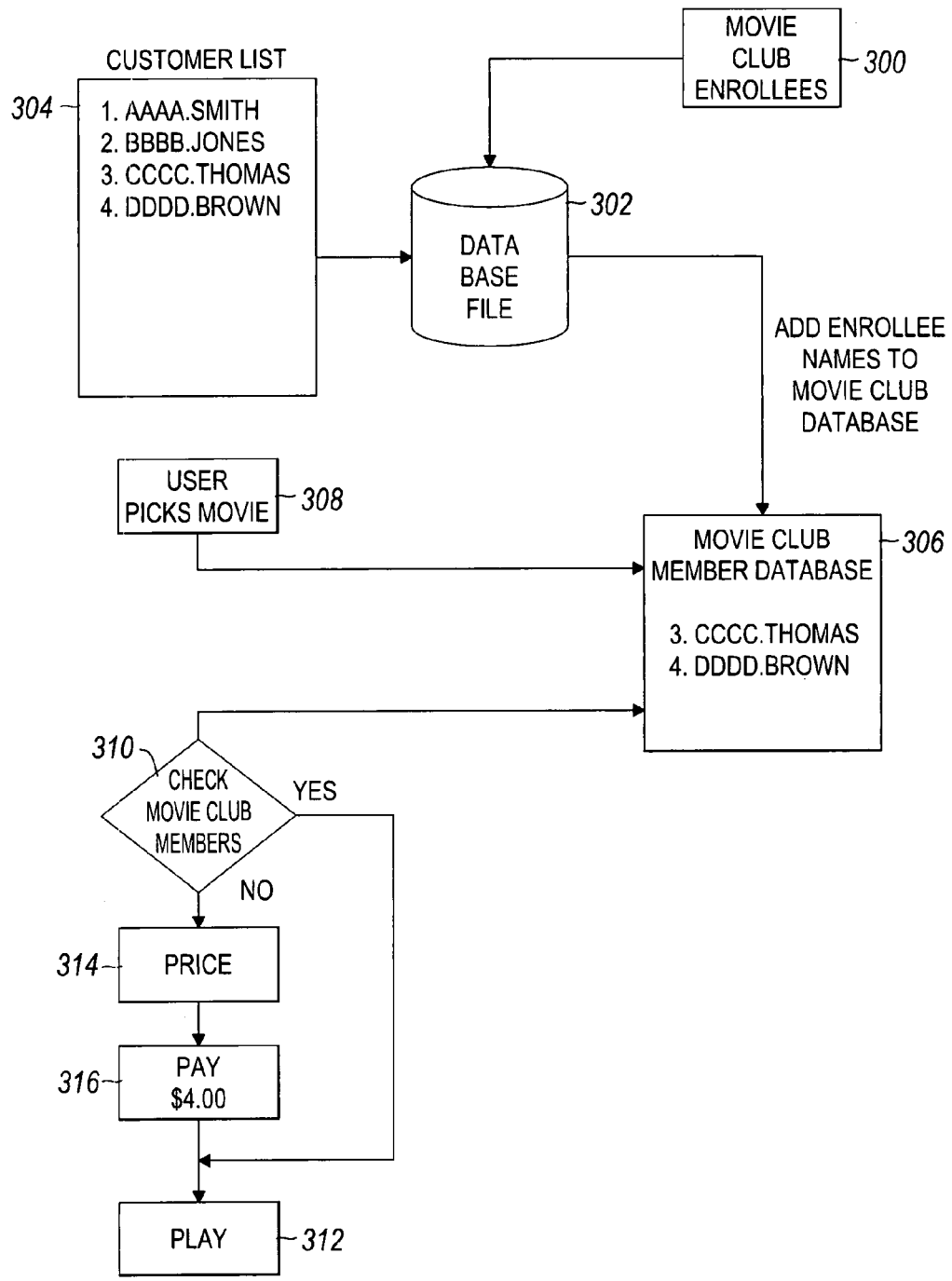
FIG. 12B is a diagram of portions of the movie club module of the present invention.

Turning to FIGS. 12A-12B, by way of general explanation, shown therein is the Movie Club Module (MCM). One of the advantages of the VVS is the ability to offer a Movie Club Module, MCM. The traditional video on demand (VOD) model, 60/40 split, cannot be offered in a monthly movie club model because the viewers could quickly exceed the monthly charge and induce a large negative cash flow. Another advantage of the VVS concept which emulates a storefront video store, as long as a sufficient quantity of available titles including new and past releases, there is no way for the cost to the system owner to get out of control. The operation of the module is such that the COS database flags monthly Movie Club Members and translates the normal purchase price into a plan, such as 5 movies per week. The uniqueness of this MCM feature is that the Movie Club is integrated with the VVS, COS and all of the other features and modules in a profitable business model.

Shown in FIG. 12A is the Movie Club Module (MCM) at 167 showing an example of the traditional video on demand model 168 wherein unlimited movie packages could be purchased so that the provider pays 60% of the $4.99 until the amount would exceed the monthly subscription fee. The MCM method is shown at 170. The library titles purchased would be similar to the traditional video store. However, the available movies being used would be compared to those available so that the monthly fee could not be exceeded. For example, if video movie 1 were viewed at 172 and it was available, it would be played as shown at 174 and there would be no studio fee 176 and then the revenue would be contributed toward the library at 178. FIG. 12B shows additional description of the MCM. The Movie Club enrollees at 300 are loaded into data base file 302 which also receives the customer list 304. The movie club member database is formed at 306. When a user chooses a movie at 308 a check is made at 310 to determine if the user is a movie club member. If the answer is yes, the movie is played at 312. If the answer is no, the user is charged a price at 314 and pays the requisite fee at 316.

Figure 13A:
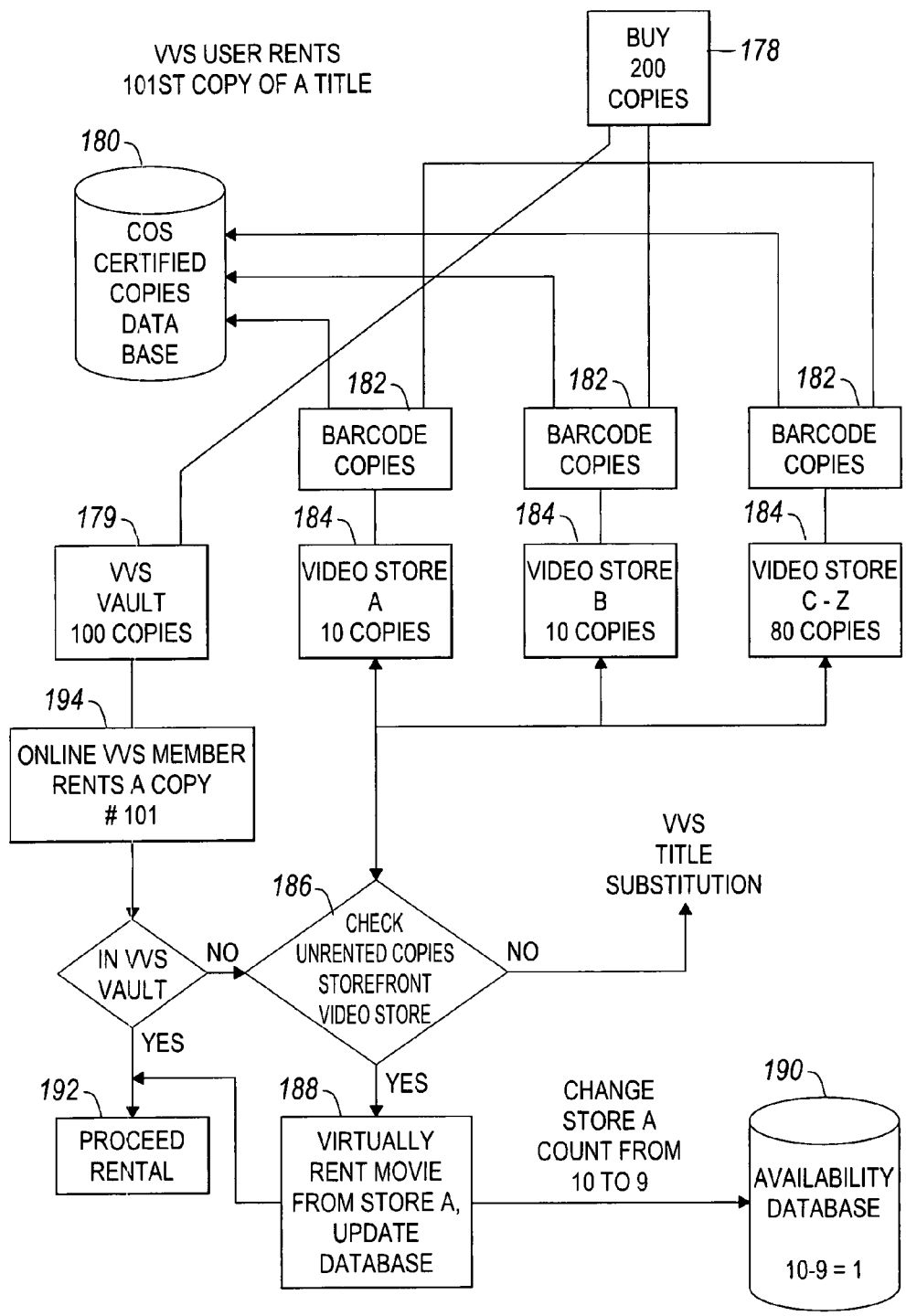
FIG. 13A is diagram of portions of a store front video store integration system of the present invention.
Figure 13B:
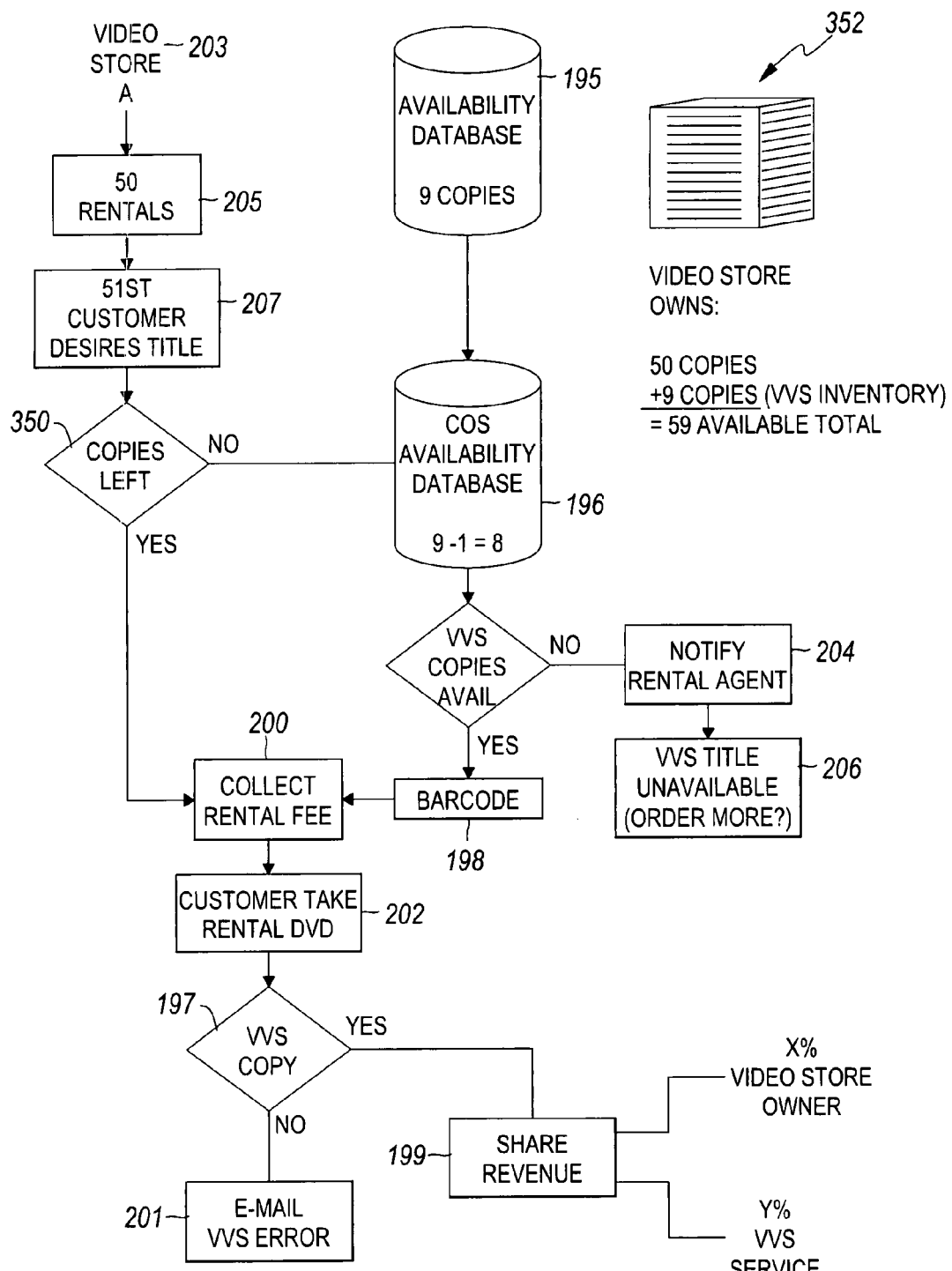
FIG. 13B is diagram of portions of a store front video store integration system of the present invention.

Turning to FIGS. 13A and 13B, by way of general explanation, shown therein is the Storefront Video Store Integration Software. The VVS is extendable to existing storefront video stores by using the COS software to determine and certify that certain copies of a title are owned by the VVS operator and STORED in a local storefront video store. The logical flow is that as new releases become available for purchase by video stores, the video store operator must decide how many of the title(s) to buy. As noted above, the APRS, and other modules permit the "virtual transfer" of titles which are actually stored in the VVS vault. For example, if the storefront video store purchases 50 titles, and the first night has a chance to rent out 60 copies, the VVS could reassign 10 titles stored on site to be added to the rental program of the local storefront video store. The important part of this is that once a title is reassigned to a storefront video store, that copy is removed from the "availability" list, and becomes unavailable until the video store re-deposits the title into the vault. On the other hand, when copies are certifiably placed inside the sealed vault, it becomes available for "virtual" rental using the VVS system in the above described systems. In order to accommodate the certification of copies being inside the vault or checked out, a DVD storage and dispensing unit must be placed in each participating storefront video store. The VVS integration software module interfaces with the storefront video store dispenser system, including the barcode tracking of each title, and "certifies" when copies are present INSIDE the in-store vault. It should become apparent that while some stores may have an excess of titles, other may have a shortage.

The VSS software is capable of managing remotely placed content from the central COS database. Part of this feature includes the rental of storefront copies inserted into the dispenser vault with a pre-printed barcode that is scanned at the time the DVD is inserted and which gets automatically added to the COS database. A VPN (Virtual Private Network) using 3DES encryption, or an equivalent form of encryption, performs communication to the VVS master COS servers. Content inside the vault remains the copy of the VVS vendor, and copies in transit between the storefront partner and the VVS central vault will be considered rented while in transit. The uniqueness of the Storefront Video Store Integration feature is the concept of storing VVS copies in storefront video stores and systematizing the transfer of titles to and from the store owner for rental as part of shared rental stock for a shared revenue.

Shown in FIG. 13A is an example of how online virtual users rent a title first from VVS vault 179, the store 200 copies are purchased at 178 and one hundred (100) copies are in the vault at 179, while the remaining 100 are physically distributed to traditional video rental stores. The COS database at 180 reads the bar codes at 182 for studio store A, B and C-Z as shown at 184 to update the number of titles stored in the on-site vault to be able to determine if the title is available from the online virtual video store at 179. If the title is not available at 179, then the remote copies 186 in the video store vaults will be used and the movie is virtually rented and the database updated at 188 and the available numbers decremented by one at 190. If copies are not available at 186 in the storefront video store vault then move to the Title Substitution procedure; if the title is in the VVS vault they can proceed to rental at 192 whereas if they are not in the vault you would have to rent another copy at 194.

Turning to FIG. 13B, is an example of how a storefront partner could rent titles from a local VVS vault when their copies are all rented out. Assume that the availability database has 9 copies available at 195 and if one was rented the database could be decremented by one at 196. Then if the DVD copy was available the barcode would be read at 198 and rental fee collected at 200 and the customer would proceed to take the rental DVD at 202. However, if no DVD copy was available then the rental agent would be notified at 204 that a copy was unavailable at 206 and that more needed to be ordered. If it was determined that the rental was a VVS copy at 197 then the revenue would be shared at 199 between the video store owner and the VVS studio. If at 197 this was not a VVS copy then an email of the error would be sent to the VVS at 201. In this example it is assumed that initially video store A at 203 would have 50 rental copies at 205 and then at 207 the $51^{st}$ customer would wish to buy the $51^{st}$ copy and then a determination is made at 350 of whether any copies are available. Note in this example the video store owns 50 copies at 352 and the 9 copies are supplied to the video store from the VVS inventory to yield a total of 59 available copies.

Figure 14:
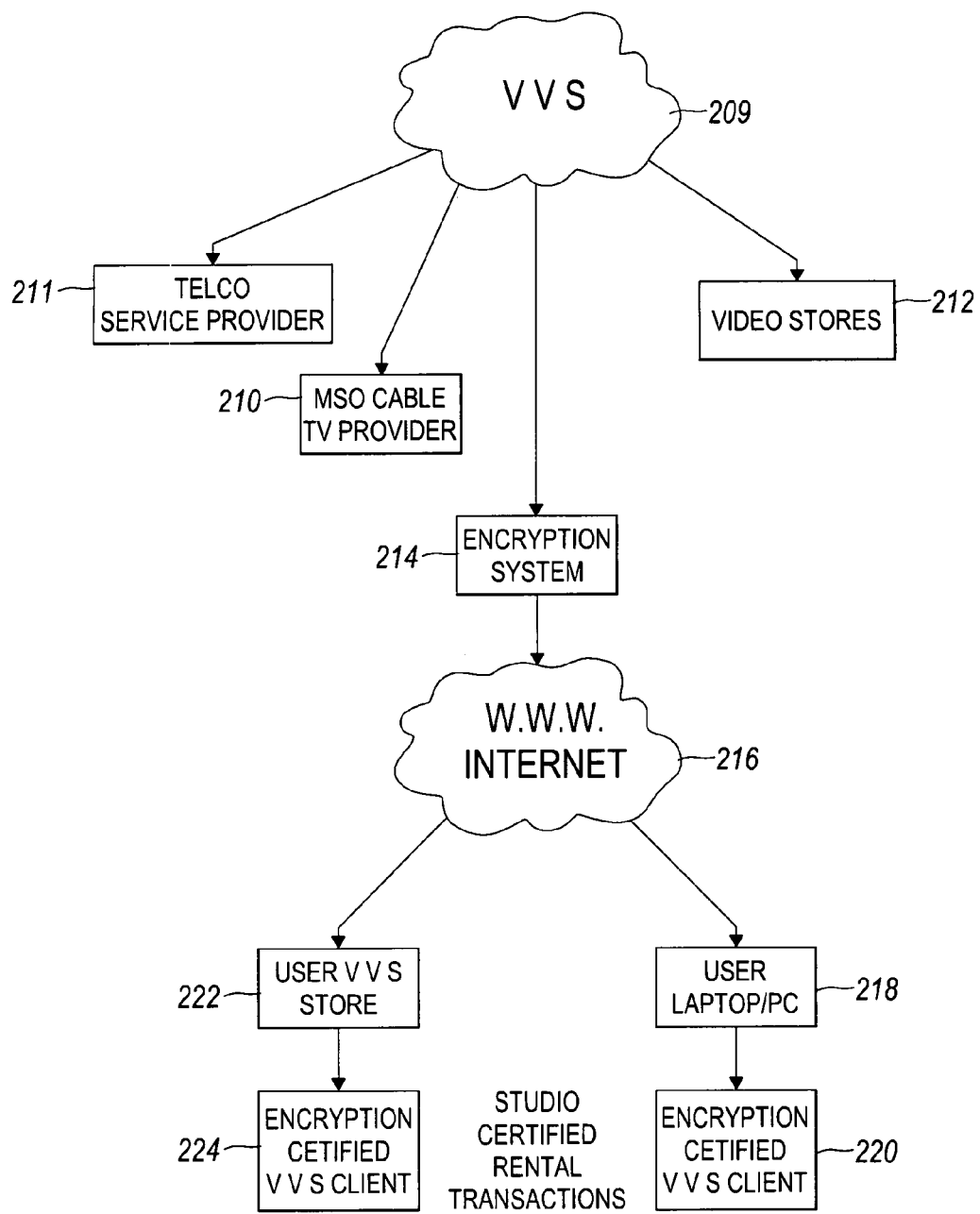
FIG. 14 is a diagram of an Internet-based distribution model of the present invention.

Turning to FIG. 14, by way of general explanation, shown therein is the Internet Based Distribution Mode of the VVS. The VVS lends itself to an internet model because of the strong emphasis on certification and content tracking. The VVS model is ideally suited for internet distribution because of the ease of IP (Internet Protocol) based communications management. Because of the above features, including the Movie Club Module, internet users can join a Member based VVS and enjoy the benefits of the VVS system from their own homes and businesses, using standard IP based STB's or PC's. VVS is the first of its kind to solve the Internet distribution of movies and games utilizing a proven business model, while protecting the interest of the artists and studios. There will be no more mailing of DVD's because, even though DVD's exist both physically or virtual, the Internet will serve as the tool to transport content to the end user. The uniqueness of the Internet Based VVS is the overall VVS system integrated into a scalable Internet model, incorporating both on-demand streaming and also a download and play version. This is an idea that is unique, timely, and solves a major issue as the studios are forced to deal with digital content and migration into the IPTV world.

Shown is the Virtual Video Store at 209 having connections to the telco service providers at 211, the MSO cable TV providers at 210, video stores at 212 and an encryption system at 214 which would allow connection to the World Wide Web or Internet at 216 wherein a user laptop/PC at 218 would allow encryption certification to VVS clients at 220 or a user virtual video store at 222 could allow encryption certified virtual video store clients at 224 all of which would be studio certified rental transactions.

In summary, the present invention comprises a system and method for electronically distributing video to one or more viewers, the system being managed by an operator at a particular distribution location, comprising: a) a storage vault, the storage vault containing one or more purchased copies of a video, the video being purchased from the owner of the video, the storage vault being disposed on-premise at the particular distribution location, the storage vault being locked so that the copies of the video are stored securely; b) an encoder wherein at least one copy of the video is digitally encoded into a video server storage unit; c) a display system for displaying the video to the viewers, the display system having display system software for interfacing between the video server storage unit and the display system; d) a distribution network for distributing the video from the video server storage unit to the display system; e) wherein the number of the videos distributed by the distribution network is less than or equal to the number of purchased copies of the video; and, f) wherein revenue is generated for the operator from renting digital copies of the purchased copies of the video a plurality of times.

I claim:

1. A system for electronically distributing video to one or more viewers, the system being managed by an operator at a particular distribution location, comprising:
   a) a storage vault, said storage vault containing one or more purchased copies of a video, said video being purchased from the owner of the video, said storage vault being disposed on-premise at the particular distribution location, said storage vault being locked so that said copies of said video are stored securely;
   b) an encoder wherein at least one copy of said video is digitally encoded into a video server storage unit;
   c) a display system for displaying said video to the viewers, said display system having display system software for interfacing between said video server storage unit and said display system;
   d) a distribution network for distributing said video from said video server storage unit to a display system;
   e) a usage timer system for calculating the remaining time of each of the rented out copies of a video and the shortest wait, tracking said wait for the benefit of users waiting for a video to become available, and, additionally, when a user "pauses" a play, said usage timer system begins to add the corresponding time to the "wait" time for that particular copy of the video;
   f) said display system also comprising a title availability/unavailability graphic user interface in a "time till available" window, wherein said title availability/unavailability graphic user interface displays to a viewer whether a video is available or if unavailable, when the title will become available;

g) wherein the number of said videos distributed by said distribution network is less than or equal to the number of purchased copies of said video; and, h) wherein revenue is generated for the operator from renting digital copies of said purchased copies of said video a plurality of times.

2. The system of claim 1, further comprising a system for content control, wherein said system thr content control is disposed prior to said distribution network to permit the content of the video to be controlled prior to distribution to the viewer.

3. The system of claim 2, wherein cover art for said video is input to said video server storage unit.

4. The system of claim 3, wherein meta data for said video is input to said display system software.

5. The system of claim 4, wherein a unique movie identification number is assigned to said video so that the number of, copies of said video can be verified.

6. The system of claim 5, further comprising a check-out system, wherein said check-out system assures the number of said videos distributed by said distribution network is less than or equal to the number of purchased copies of said videos in said storage vault, wherein said check-out system comprises billing capability for billing the viewer for the video.

7. The system of claim 6, further comprising availability certification software and middleware, wherein said availability certification software verifies the number of viewers of said video is less than or equal to the number of purchased copies of said video thereby making said video available for distribution to a viewer and transfers the availability status of said video to said middleware, wherein said middleware transmits the availability status to a user interface for display to a potential viewer to allow the potential user to make a determination of whether to view the video.

8. The system of claim 7, further comprising a usage cancellation software, wherein said usage cancellation software decrements an availability counter when a viewer begins to view a video title and increments the availability counter when a viewer ceases to view the video title.

9. The system of claim 8, further comprising a title resume memory software, wherein said title resume memory software monitors the title and actual viewing time by a viewer of a video so that if the viewer stops the video at a point prior to the end of the video the viewer can be offered a choice of either starting the video over again or resuming viewing of the video at the stopping point of the video.

10. The system of claim 9, further comprising an automatic purchase requisition software, wherein said automatic purchase requisition software will purchase additional copies of said video if viewers request more copies of said video than are currently stored in said storage vault.

11. The system of claim 10, further comprising a title substitution system, wherein said title substitution system provides an alternative video to a viewer in the event that a video is unavailable for viewing at a particular time.

12. The system of claim 11, further comprising a library control system, wherein said library control system displays the available titles of a video and the unavailable titles of a video in ascending order based on the time of availability of the video.

13. A method for electronically distributing video to one or more viewers, the method being managed by an operator at a particular distribution location, comprising the steps of:

a) providing a storage vault, the storage vault containing one or more purchased copies of a video, the video being purchased from the owner of the video, the storage vault being disposed on-premise at the particular distribution location, the storage vault being locked so that the copies of the video are stored securely;

b) encoding at least one copy of the video into a video server storage unit;

c) providing a display system for displaying the video to the viewers, the display system having display system software for interfacing between the video server storage unit and the display system;

d) providing a distribution network for distributing the video from the video server storage unit to the display system;

e) providing a usage timer system for calculating the remaining time of each of the rented out copies of a video, calculating the shortest wait and tracks that for the benefit of users waiting for a video to become available, and when a user "pauses" a play, said usage timer system adding a corresponding time to a "wait" time for that particular copy of the video;

f) said display system also comprising a title availability/unavailability graphic user interface in a "time till available" window, wherein said title availability/unavailability graphic user interface displays to a viewer whether a video is available or if unavailable when the title will become available;

g) wherein the number of the videos distributed by the distribution network is less than or equal to the number of purchased copies of the video; and, h) wherein revenue is generated for the operator from renting digital copies of the purchased copies of the video a plurality of times.

14. The method of claim 13, further comprising the step of providing a system for content control, wherein the system performs the content control prior to distribution of the video so that the content of the video is controlled prior to distribution of the video to the viewer.

15. The method of claim 14, wherein cover art for the video is input to the video server storage unit.

16. The method of claim 15, wherein meta data for the video is input to the display system software.

17. The method of claim 16, wherein a unique movie identification number is assigned to the video so that the number of copies of the video can be verified.

18. The method of claim 17, further comprising the step of providing a check-out system, wherein the check-out system assures the number of the videos distributed by the distribution network is less than or equal to the number of purchased copies of the videos in the storage vault, wherein the check-out system comprises billing capability for billing the viewer for the video.

19. The method of claim 18, further comprising the step of providing availability certification software and middleware, wherein the availability certification software verifies the number of viewers of the video is less than or equal to the number of purchased copies of the video thereby making the video available for distribution to a viewer and transfers the availability status of the video to the middleware, wherein the middleware transmits the availability status to a user interface for display to a potential viewer to allow the potential user to make a determination of whether to view the video.

20. The method of claim 19, further comprising the step of providing a usage cancellation software, wherein the usage cancellation software decrements an availability counter when a viewer begins to view a video title and increments the availability counter when a viewer ceases to view the video title.

21. The method of claim 20, further comprising the step of providing a title resume memory software, wherein the title resume memory software monitors the title and actual viewing time by a viewer of a video so that if the viewer stops the video at a point prior to the end of the video the viewer can be offered a choice of either starting the video over again or resuming viewing of the video at the stopping point of the video.

22. The method of claim 21, further comprising the step of providing an automatic purchase requisition software, wherein the automatic purchase requisition software will purchase additional copies of the video if viewers request more copies of the video than are currently stored in the storage vault.

23. The method of claim 22, further comprising the step of providing a title availability/unavailability graphic user interface, wherein the title availability/unavailability graphic user interface displays to a viewer whether a video is available or unavailable for viewing at a particular time.

24. The method of claim 23, further comprising the step of providing a title substitution system, wherein the title substitution system provides an alternative video to a viewer in the event that a video is unavailable for viewing at a particular time.

25. The method of claim 24, further comprising the step of providing a library control system, wherein the library control system displays the available titles of a video and the unavailable titles of a video in ascending order based on the time of availability of the video.

* * * * *